United States Patent … Sundar et al.

(10) Patent No.: US 7,450,743 B2
(45) Date of Patent: Nov. 11, 2008

(54) METHOD AND SYSTEM OF AFFINE REGISTRATION OF INTER-OPERATIVE TWO DIMENSIONAL IMAGES AND PRE-OPERATIVE THREE DIMENSIONAL IMAGES

(75) Inventors: Hari Sundar, Somerset, NJ (US); Chenyang Xu, Allentown, NJ (US); Frank Sauer, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 783 days.

(21) Appl. No.: 11/036,528

(22) Filed: Jan. 14, 2005

(65) Prior Publication Data
US 2005/0203385 A1 Sep. 15, 2005

Related U.S. Application Data

(60) Provisional application No. 60/537,820, filed on Jan. 21, 2004.

(51) Int. Cl.
*G06K 9/00* (2006.01)
(52) U.S. Cl. ......................................... 382/128; 378/62
(58) Field of Classification Search ................. 382/128; 378/4, 62
See application file for complete search history.

(56) References Cited

U.S. PATENT DOCUMENTS 5,930,329 A * 7/1999 Navab ...................... 378/98.12

2007/0001879 A1* 1/2007 Kaftan et al. ................. 341/79

OTHER PUBLICATIONS

Dimitrov, P., "Robust and Efficient Skeletal Graphs", 2000, IEEE.*
Haris K. et al., "Model-based morphological segmentation and labeling of coronary angiograms," *IEEE Transactions on Medical Imaging IEEE USA*, (1999) vol. 18:10 pp. 1003-1015 XP011035902 ISSN: 0278-0062.
Bullitt E et al., "Analysis of time-varying images using 3D vascular models," *Applied Imagery Pattern Recognition Workshop, AIPR,* (2001) pp. 9-14 XP010584335 ISBN: 0-7695-1245-3.
Chalopin C et al., "Automatic labeling of the coronary tree using a three dimensional reference prior model," *Computers in Cardiology,* (1998) pp. 761-764 XP010314230 ISBN: 0-7803-5200-9.

(Continued)

*Primary Examiner*—David V Bruce
(74) *Attorney, Agent, or Firm*—Michele L. Conover

(57) ABSTRACT

A system and method for registering a sequence of inter-operative two dimensional (2D) medical images of a target feature with pre-operative three dimensional (3D) medical images of the target feature is disclosed. The 3D image of the target feature is converted to a first skeletal graph. The 2D image of the target feature is converted to a second skeletal graph. Graph matching of the first and second skeletal graphs is performed to obtain a rough alignment of the graphs, and the first and second skeletal graph registered.

24 Claims, 7 Drawing Sheets

OTHER PUBLICATIONS

Liu A et al., "3D/2D registration via skeletal near projective invariance in tubular objects," *Medical Image Computing and Computer-Assisted Intervention-MICCAI 1998 First International Conference Proceedings Springer-Verlag Berlin, Germany*, (1998) pp. 952-963 XP002368656 ISBN: 3-540-65136-5.

Chalopin C et al. "Modeling the 3D coronary tree for labeling purposes," *Medical Image Analysis*, (2001) vol. 5:4 pp. 301-315 XP002368657 ISSN: 1361-8415.

Lifeng et al., "A New Method Based on Contour Feature for Multi-modality Medical Image Registration", CT Theory and Application, vol. 9, No. 1, pp. 1-7.

Zhang et al., "Multi-dimensional registration of X-ray image and CT image", ACTA Electronica Sinica, vol. 30, No. 10, pp. 1573-1576.

* cited by examiner

METHOD AND SYSTEM OF AFFINE REGISTRATION OF INTER-OPERATIVE TWO DIMENSIONAL IMAGES AND PRE-OPERATIVE THREE DIMENSIONAL IMAGES

CROSS REFERENCE TO RELATED APPLICATION

This application claims the benefit of U.S. Provisional Application Ser. No. 60/537,820, filed on Jan. 21, 2004, which is incorporated by reference in its entirety.

FIELD OF THE INVENTION

The present invention is directed to a method and system for registering inter-operative and pre-operative images, and more particularly, to a feature based method and system for registering inter-operative two dimensional images with pre-operative three dimensional images.

BACKGROUND OF THE INVENTION

Imaging of human tissue and organs is an important tool used to assist in the diagnosis and treatment of many medical conditions. Imaging modalities such as Magnetic Resonance Imaging (MRI) and Computed Tomography (CT) produce high quality three dimensional (3D) images. These imaging modalities are typically used to image a patient pre-operatively.

Indeed, in breast cancer, prostrate cancer and brain tumor procedures, preoperative imaging depicts tumor extent better because of the ability to perform dynamic imaging, parametric modeling, and diffusion or other functional MR or CT imaging methods with acquisition times that would be impractical for interactive intra-procedural imaging. Typically during a procedure two dimensional (2D) fluoroscopic images are taken. These images, while useful for providing real-time monitoring of interventional devices, do not have the image quality and tissue contrast of the closed magnet MR and CT.

Interventional fluoroscopic imaging or intra-procedural fluoroscopic imaging is used to guide instruments for diagnostic or minimally invasive therapeutic interventions. Interventional and surgical procedures require the physician to have access to updates about the patient anatomy or changing position of movable organs. Real-time imaging during intervention (without registration) establishes the necessary relationship between the patient and the images. The lower image quality of the fluoroscopic images prohibits their usage for a variety of the procedures. There is a need for a registration procedure which augments fluoroscopic inter-operative images (volume is considered to be a three-dimensional image and is referred to as an image hereafter) with high quality pre-operative volume/images from a conventional high field magnet MRI system or CT system.

SUMMARY OF THE INVENTION

The present invention is directed to a system and method for registering a sequence of inter-operative two dimensional (2D) medical images of a target feature with pre-operative three dimensional (3D) medical images of the target feature. The 3D image of the target feature is converted to a first skeletal graph. The 2D image of the target feature is converted to a second skeletal graph. Graph matching of the first and second skeletal graphs is performed to obtain a rough alignment of the graphs, and the first and second skeletal graph registered.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for registering pre-operative three dimensional images with inter-operative two dimensional images to help guide the interventional procedures. Different modalities can be used to obtain the three dimensional images such as Magnetic Resonance Imaging (MRI) or Computed Tomography. Examples of such devices which can be used to obtain the images are the MAGNETOM Symphony and the SONATOM Sensation both manufactured by Siemens AG.

Figure 1:
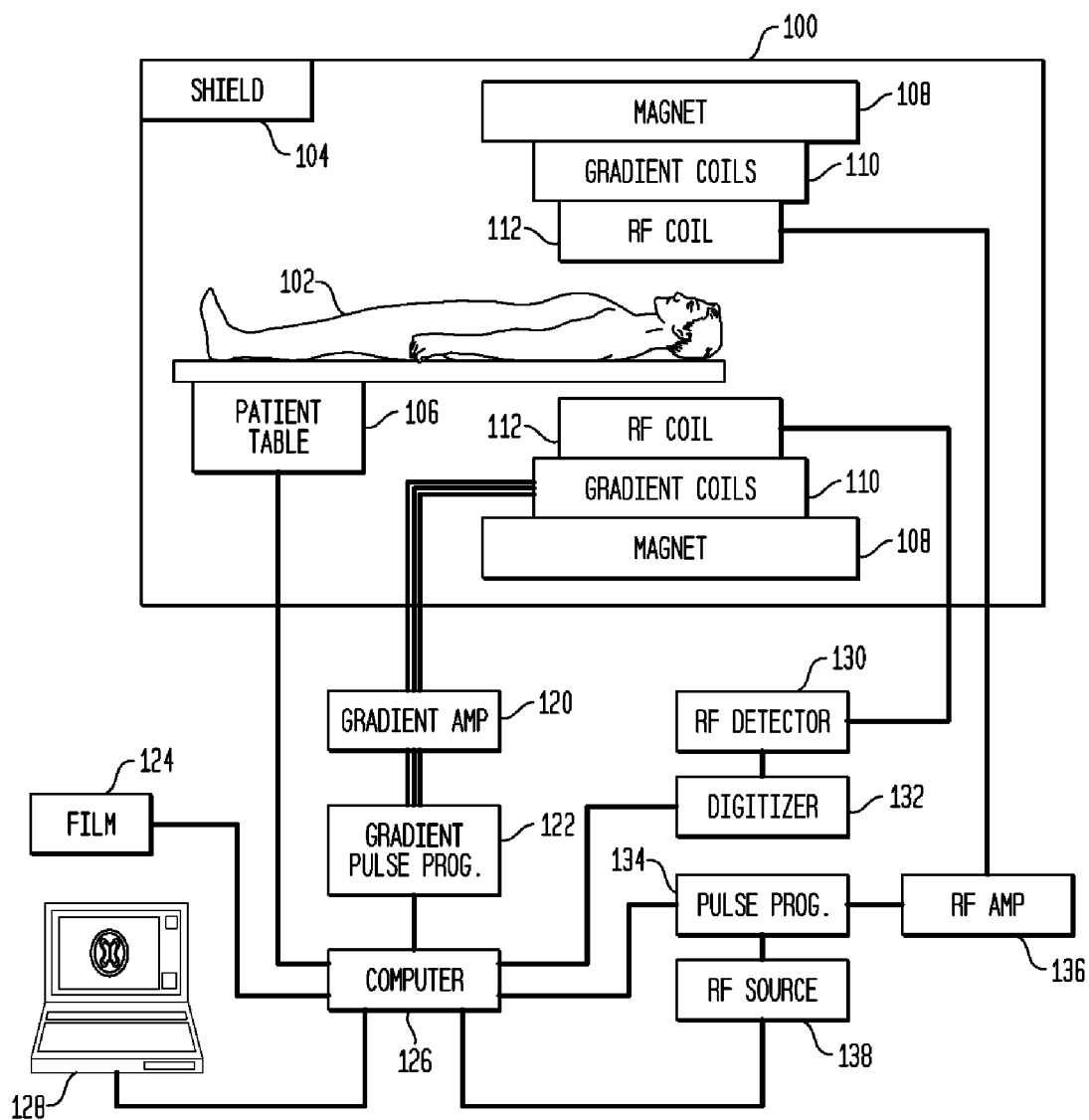
FIG. 1 is a schematic diagram of a system architecture for an exemplary Magnetic Resonance Imaging (MRI) system in accordance with the present invention.

FIG. 1 illustrates a schematic representation of components of an exemplary MRI system which can be used to obtain high quality pre-operative 3D images in accordance with the present invention. The MRI system is located in a scan room 100. A magnet 108 produces a first magnetic field for the imaging procedure. Within the magnet 108 are gradient coils 110 for producing a gradient in the magnetic field in the X, Y, and Z directions. Within the gradient coils 110 is a Radio Frequency (RF) coil 112. The RF coil 112 produces a second magnetic field necessary to rotate the spins by 90° or 180°. The RF coil 112 also detects the signal from the spins within the body.

A patient 102 is positioned within the magnet 108 by a computer controlled patient table 106. The table 106 has a positioning accuracy of 1 mm. The scan room 100 is surrounded by an RF shield 104. The shield 104 prevents the high power RF pulses from radiating out through the hospital. It also prevents the various RF signals from television and radio stations from being detected by the MRI system. Some scan rooms are also surrounded by a magnetic shield which contains the magnetic field from extending too far into the hospital. In newer magnets, the magnet shield is an integral part of the magnet.

A central element of the MRI system is computer 126. Computer 126 controls all components on the MRI system. The RF components under control of the computer 126 are the radio frequency source 138 and pulse programmer 134. The radio frequency source 138 produces a sine wave of the desired frequency. The pulse programmer 134 shapes the RF pulses into apodized sinc pulses. An RF amplifier 136 increases the pulses power from milli Watts to kilo Watts. The computer 126 also controls the gradient pulse programmer 122 which sets the shape and amplitude of each of the three gradient fields. The gradient amplifier 120 increases the power of the gradient pulses to a level sufficient to drive the gradient coils 110.

An operator of the MRI system gives input to the computer 126 through a control console 128. An imaging sequence is selected and customized from the console 128. The operator can see the images on a video display located on the console 128 or can make hard copies of the images on a film printer (not shown).

In accordance with the present invention, prior to a surgical procedure a patient would be imaged by a high modality imaging system such as the described MRI system. During the surgical procedure additional lower quality two dimensional images are taken. Typically an X-ray system is used to obtain these images. An example of such a system is the AXIOM Artis MP which is manufactured by Siemens AG.

Figure 2:
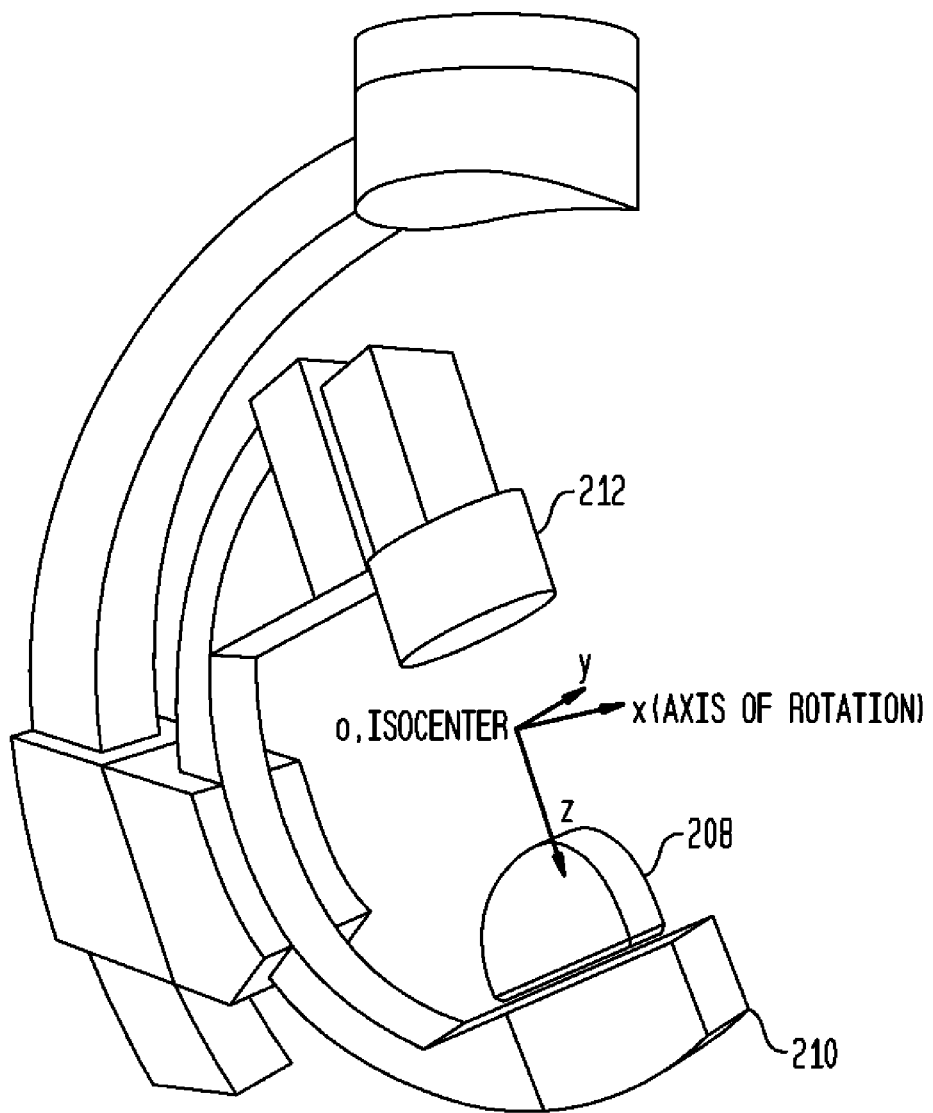
FIG. 2 is a schematic diagram of an exemplary C-arm gantry for obtaining two dimensional intra-operative images in accordance with the present invention.

FIG. 2 is a schematic illustration of a fluoroscopic X-ray imaging system. A C-arm 212 carries an X-ray source 208 and an image intensifier 210 in an orbit (for example, a circular path) around a patient. As known to those skilled in the art, X-ray image is a radiographic projection of an object onto a plane. It may be considered as a two dimensional function of x and y such that at each point (x,y) it records the aggregate of all the absorptions along the ray emanating from the X-ray source 208 to the point (x,y) on the image plane. 3D angiographic data is acquired by rotating a C-arm gantry of an X-ray device about its isocenter with the patient present.

Figure 3:
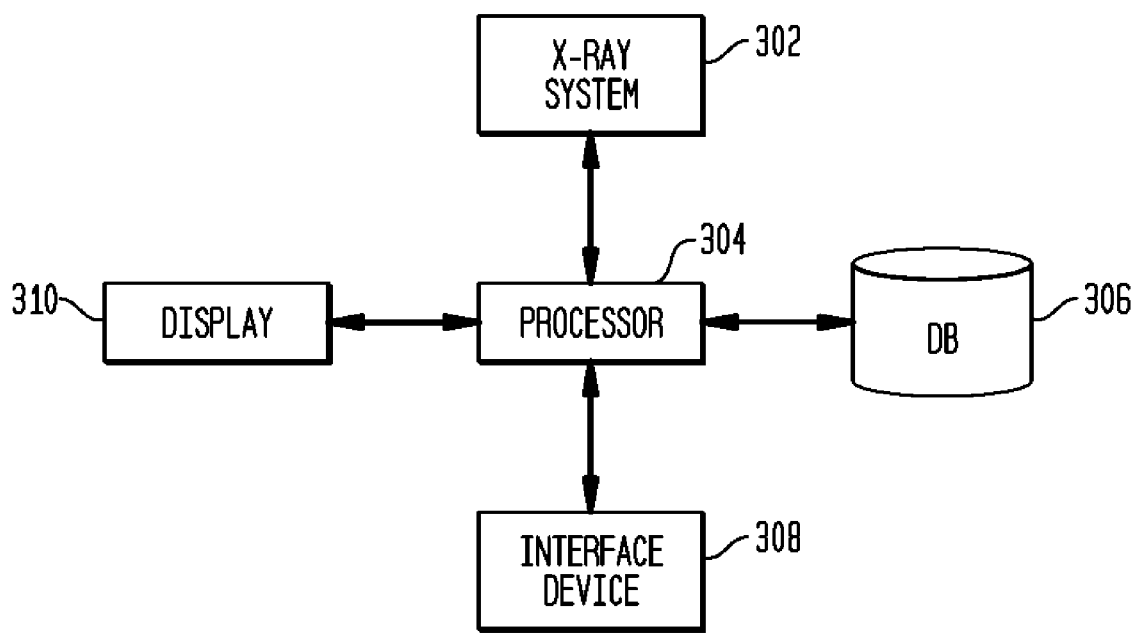
FIG. 3 is a schematic block diagram illustrating a system for registering three dimensional pre-operative image with two dimensional intra-operative images in accordance with the present invention.

FIG. 3 is a block diagram of an exemplary system for registering pre-operative 3D images with inter-operative 2D images in accordance with the present invention. The present invention exploits the pre-operative image and inter-operative image to provide a more useful and inexpensive registered image of a target feature, such as blood vessels within a particular tissue region, which is the subject of a minimally invasive therapeutic intervention. For example, a tumor can be imaged both pre-operatively using a closed MRI system or CT system and inter-operatively using fluoroscopy system. The images are registered and merged to provide both structural and functional information about the tumor and the effected tissue region. Subsequent images taken inter-operatively using the fluoroscopy system can then be merged with the pre-operative images over time to assist the physician. In the instance where deformations are detected inter-operatively, the present invention can also be used to modify the pre-operative image to emulate deformations prior to registration with the inter-operative images.

A three dimensional (3D) image of a desired tissue region or an organ is obtained by employing a closed MRI system (FIG. 1) or CT system (not shown) such as, for example, a 1.5 T MAGNETOM Sonata scanner, commercially available from Siemens Medical Solutions. Data is collected from an image of the tissue region or organ and stored for further processing by processor 304. In particular, a target feature, such as a section of blood vessels associated with a particular tissue region, is segmented from the image and a skeletal graph is stored as will be described in greater detail hereinafter. This image is obtained prior to any operative procedure. Other organs or internal structures may also be imaged as needed.

A two dimensional (2D) image of the same desired target feature is then obtained by employing a fluoroscopy system 302. During the operative procedure, an initial image is obtained and stored in processor 304. Rigid registration of the 2D image from the fluoroscopy system and the pre-operative 3D image from the closed MRI is performed. Preferably, the 3D pre-operative image and the 2D inter-operative image are in a relatively similar state. For example, an internal organ that is imaged should be in approximately the same state (e.g., position and perspective) for both imaging processes to ensure proper registration.

As indicated above, the 3D image data and the 2D image data are input to processor 304. Processor 304 may include a Graphical User Interface (GUI), which permits a user to manually draw a border or contour around a region of interest in the images. Alternatively, a segmentation algorithm may be employed to differentiate regions of interest and draw contours for images without user interaction. Segmentation algorithms known to those skilled in the art may be employed. Processor 304 includes a database 306 that stores the images.

A display 310 is included for displaying the images and displaying the registered images. An interface device or devices 308 are also included such as a keyboard, mouse or other devices known in the art.

Figure 4A:
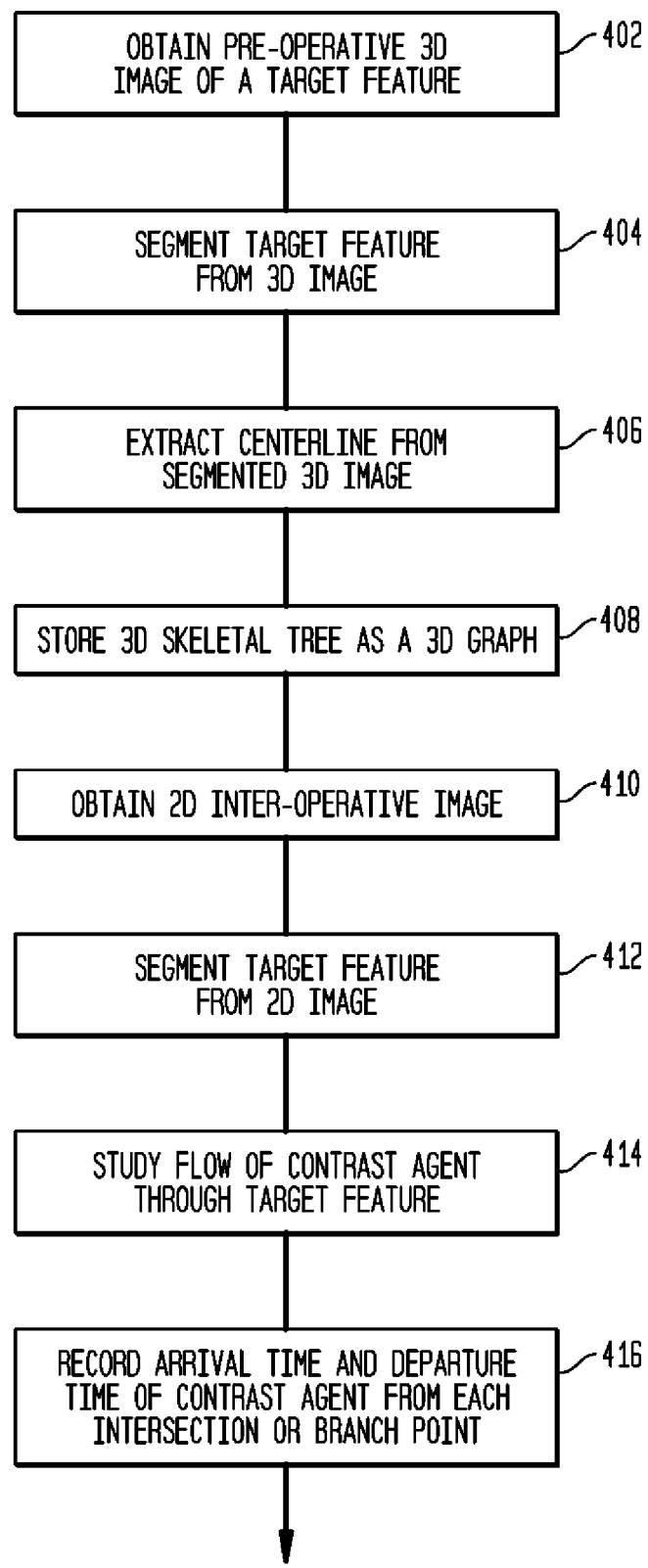
FIGS. 4a-b are a flow diagram that illustrates a process for registration of pre-operative and inter-operative images in accordance with the present invention.
Figure 4B:
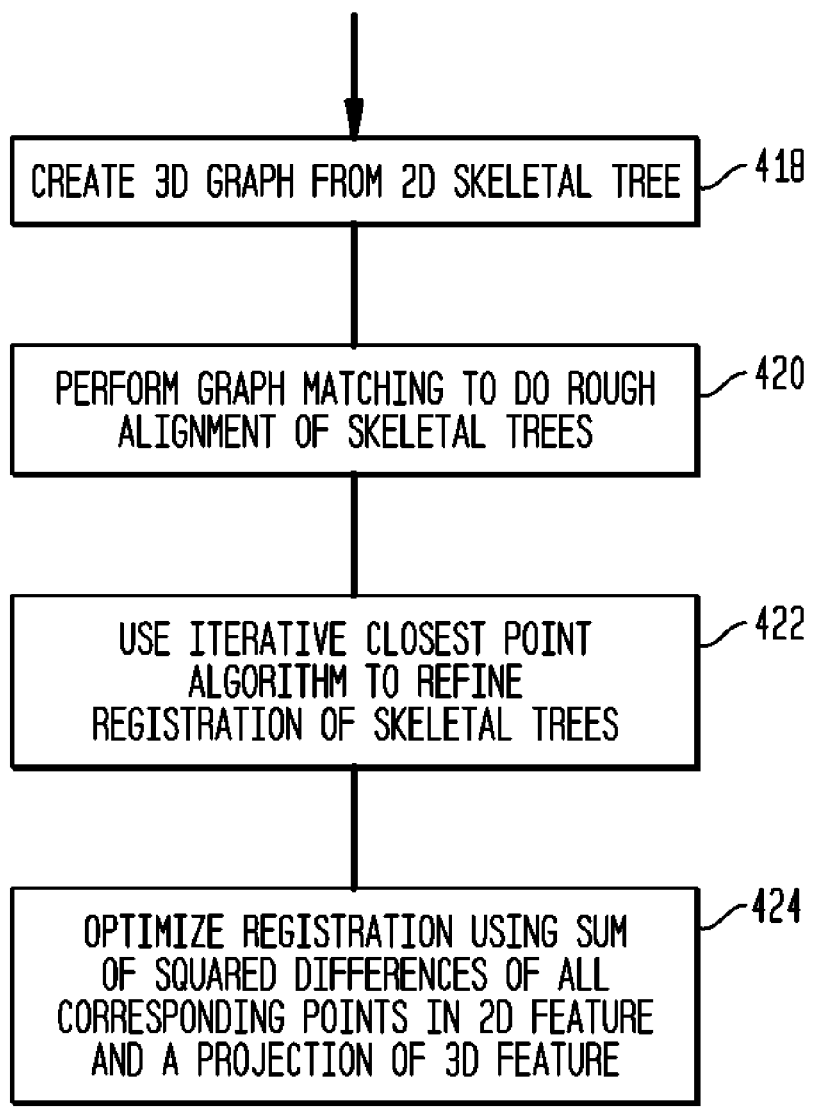

FIGS. 4a-4b are a flow chart that illustrates a method for registering pre-operative 3D images with inter-operative 2D images in accordance with the present invention. A patient undergoes a MRI or CT scan prior to an operative procedure to obtain pre-operative 3D images of a target feature (step 402). The 3D image from the scan is stored for later usage. In accordance with the present invention, the target feature is blood vessels. By observing blood vessels and surrounding tissue, various conditions can be diagnosed. For example, such a method can be used to detect cancer cells in the liver, brain conditions, and cardiac conditions.

The target feature is segmented from the 3D image (step 404). Since contrast agents are commonly injected into the target area during interventional procedures, segmenting the blood vessels is fairly easy. The flow of the contrast agent through the blood vessels is also used to extract the 3D vessels from the fluoroscopy image sequence as will be described in further detail hereinafter. The 3D image provides a high resolution view of the desired area and allows the user to visualize soft tissues in the area as well as the ability to make depth measurements.

Next, a centerline is extracted from the segmented 3D image (step 406). In accordance with the present invention, a parallel thinning algorithm for 3D object thinning is used to identify the centerline. An example of such an algorithm is described in the article "A Parallel Thinning Algorithm or 3-D Pictures" by Tsao and Fu, *Computer Graphics and Image Processing*, 17:315-331, 1981 which is incorporated by reference in its entirety. Extracting the centerline provides a set of voxels that lie on the medial axes of the blood vessel. A test is performed for connectivity which is used to identify vessel segments and branches. For example, voxels that are part of a vessel segment typically have only two neighbors whereas branch voxels usually have more neighbors as demonstrated below:

xx xxxxxx xxxxxo xxxxxxxx where o is a branch voxel and the xs are neighboring voxels.

Figure 5:
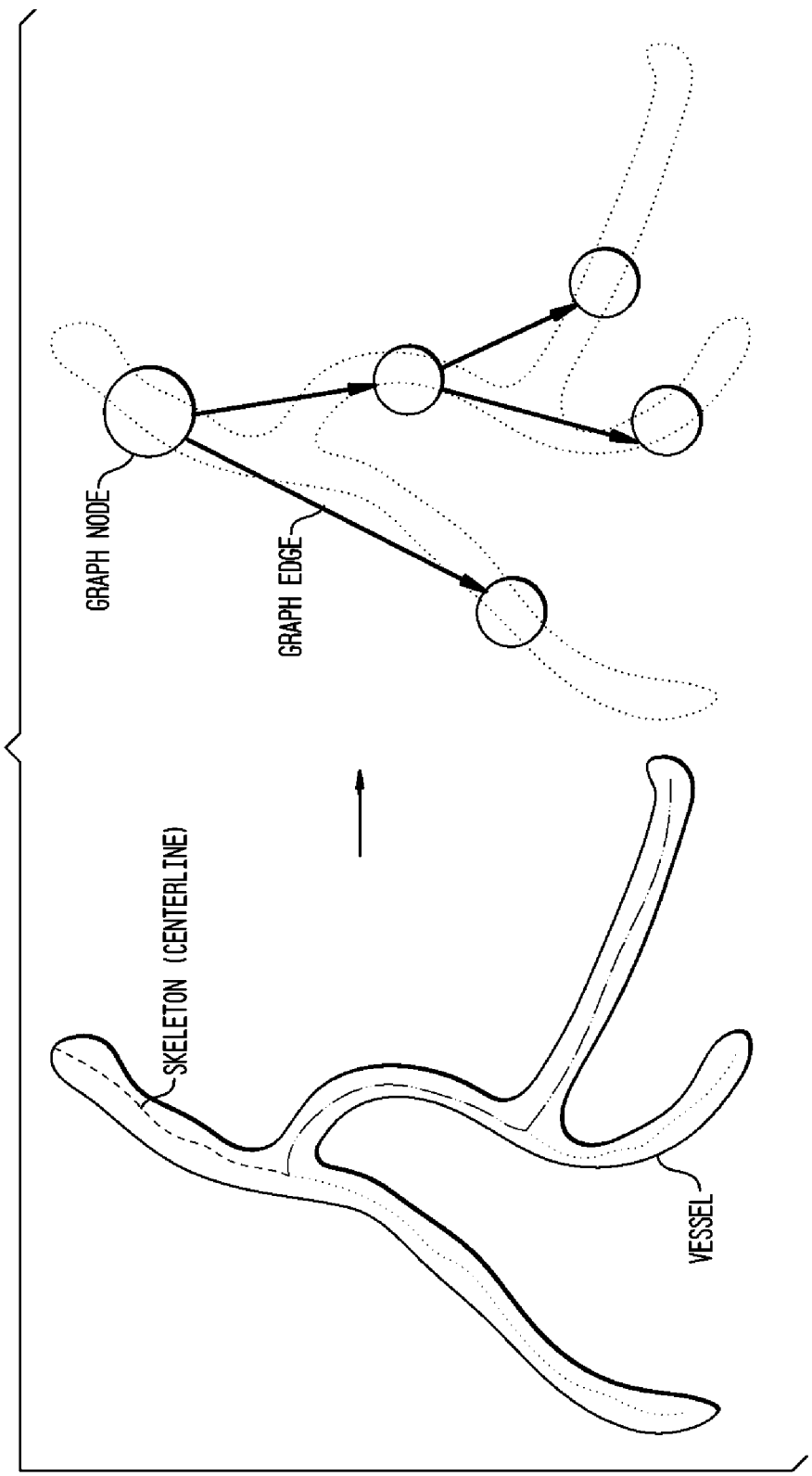
FIG. 5 is a representation of a skeletal graph of a target feature and a corresponding 3D graph in accordance with the present invention.

A 3D skeletal tree is achieved from the thinning algorithm and stored in database 306 as a 3D graph (step 408). An example of such a representation is illustrated in FIG. 5. The skeletal graph is generated by representing each vessel segment as a node in the skeletal graph. Additional information about the vessel segment is also stored in database 306. Such information may include the length and diameter of the vessel segment as an attribute of the node. The connectivity information between the vessel segments is represented as edges in the skeletal graph. Because of the inherent structure of blood vessels, the skeletal graph is always in a tree format. More particularly, the graphs are usually finite rooted trees. The skeletal graphs are converted into directed acyclic graphs by assigning a direction to the edges based on the flow of the contrast agent (which will be obtained from the 2D graph as described hereinafter) and from the larger diameter vessel node to smaller diameter vessel node (for the 3D graph).

Next, the patient is scanned at the beginning of the operative procedure using a 2D fluoroscopy system (step 410). Preferably, the patient is positioned in essentially the same position as when the patient was scanned by the pre-operative 3D imaging system and the angle and perspective of the scans are similar. The image from the 2D scan is stored as well.

The target feature is then segmented from the 2D images (step 412). This is done by subtracting the feature from a zero contrast image. Once the target feature has been segmented, it is desired to obtain a 3D graph of the 2D image. However, it is not a straightforward task. Because the 2D image does not provide any indications of the depth of the objects in the image, it is difficult to distinguish whether overlapping objects are connected. For example, in the instance where the target feature is a series of blood vessels, it is not possible to distinguish in the 2D image whether certain segments of the blood vessels overlap and are therefore separate blood flows, or whether the overlapping segments indicate a branching of connected blood vessels.

In order to make this distinction, the flow of the contrast agent through the blood vessels is study over a given time period (step 414). The flow of the contrast agent through the blood vessels can be accomplished by using a method similar to that for matching rooted directed acyclic graphs. Such a method is described in "Skeleton Based Shape Matching and Retrieval" by H. Sundar et al. n the *Proceedings, Shape Modeling and Applications Conference*, SMI 2003 which is incorporated by reference in its entirety. A graph of the blood vessels is created by recording the arrival time and departure time of the flow of the contrast agent from each intersection or branch point of the blood vessels. By monitoring the flow, depth determinations can be made.

Figure 6:
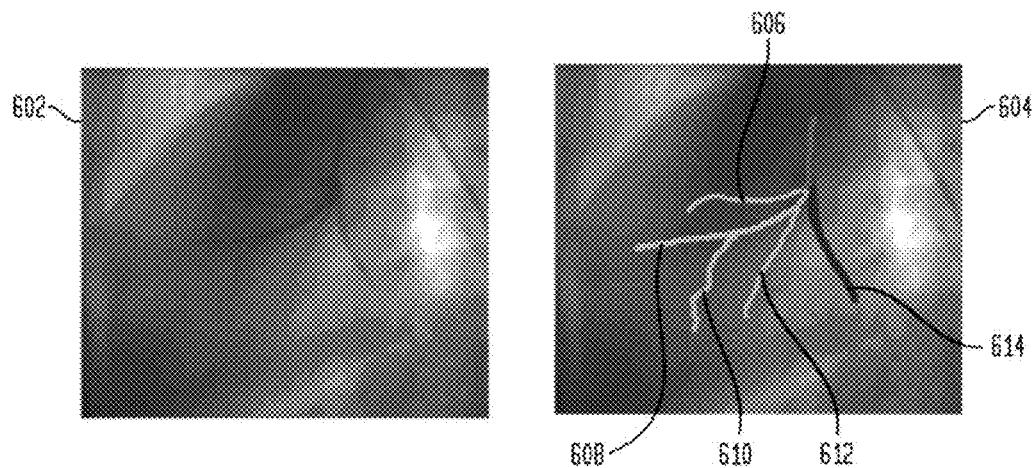
FIG. 6 is a representation of how the flow of a contrast agent is monitored in a series of blood vessels at a first period in time in accordance with the present invention.

In accordance with the present invention, the arrival time and departure time of the flow of the contrast agent from each intersection or branch point is recorded (step 416). FIG. 6 is a graphical representation of how the flow of the contrast agent is tracked through the blood vessels. At a first point in time, the starting point of the contrast agent is determined. Next, the flow of the contrast agent through the blood vessels is tracked at a predetermined interval. This monitoring is repeated at predetermined intervals so that the flow of the contrast agent can be analyzed to determine the structure of the blood vessels. Image 602 shows a tissue region containing blood vessels in the absence of a contrast agent. Image 604 shows the same tissue region in which a contrast agent has been injected into the blood vessels and monitored over a predetermined time period.

As the contrast agent flows through a particular segment of the blood vessel, the vessel is highlighted to indicate whether a particular segment is connected to an adjacent segment or whether the two segments overlap. While FIG. 6 illustrates the blood vessels in varying grayscale intensities to show this relationship, it is to be understood by those skilled in the art that other representations can be used such as different color schemes. Each branch of the blood vessels 606-614 are a different intensity.

Figure 7:
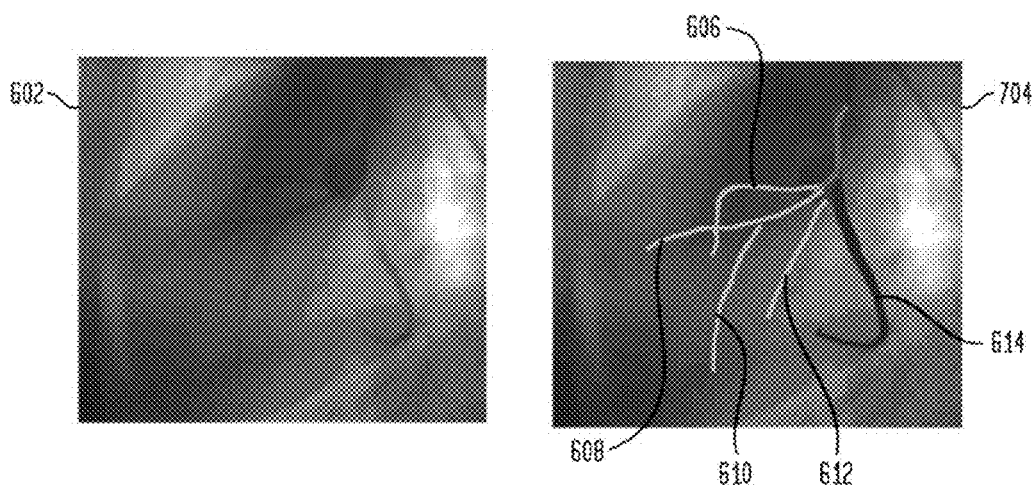
FIG. 7 is a representation of how the flow of a contrast agent is monitored in a series of blood vessels at a second period in time in accordance with the present invention.

FIG. 7 shows the same tissue region 602 and an image 704 which shows the flow of the contrast agent at a later point in time than for image 604. From this image it can be seen that vessels 606 and 608 overlap and are not connected. Such determinations help determine depth measurements in the tissue region and aid in registering the 2D fluoroscopy image with the 3D image.

Once the flow of the contrast agent through the blood vessels has been analyzed, a 3D graph is created from the 2D skeletal tree (step 418). The 3D graph illustrates the structure of the blood vessels in the tissue region and clarifies any ambiguities with respect to overlapping vessels and false intersections. Next, graph matching of the 3D graphs is performed by roughly aligning the skeletal trees from the 2D and 3D images (step 420). Methods commonly used for matching rooted directed acyclic graphs can be used to accomplish this step. One example of such a method is described in "Skeleton Based Shape Matching and Retrieval" by H. Sundar et al. mentioned above.

Once the rough alignment is obtained, an Iterative Closest Point (ICP) algorithm is used to refine the registration of the skeletal trees (step 422). A monoplanar fluoroscopy image is used to perform the 2D-3D registration. The graph matching not only provides a rough alignment; it also provides the vessel correspondence between the 2D and 3D skeletons. The correspondence is used as a constraint while applying the ICP algorithm to the centerlines (set of points). This helps to avoid the local minima during the registration process which makes the algorithm very robust.

In addition, the entire sequence of 2D images obtained during the monitoring of the flow of the contrast agent is used during the 2D-3D registration. This information is used mainly to avoid the ambiguities that are present in monoplanar projections of 3D images. The registration parameters are optimized by using a sum of squared differences of all corresponding points in the 2D feature and a projection of the 3D feature (step 424). The optimization is performed for six parameters, three translational and three rotational.

Having described embodiments for a method for registering 3D pre-operative images with 2D inter-operative images, it is noted that modifications and variations can be made by persons skilled in the art in light of the above teachings. For example, the present invention is primarily directed to rigid registration of images, however deformable registration may also be performed. In such a case, the optimization step would include parameters for controlling the deformation. Once primary registration between the 2D and 3D images is accomplished, registration can be maintained by tracking the feature in the 2D image. Any known motion-tracking algorithm can be used for this purpose.

Shape models can also be used by obtaining the shape model from the 3D image or from previous 2D image sequences. The shape models can be used to guide the skeletal extraction and for the optimization steps.

It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for registering a sequence of inter-operative two dimensional (2D) medical images of a target feature with pre-operative three dimensional (3D) medical images of the target feature comprising the steps of:
converting the 3D image of the target feature to a first skeletal graph;
converting the 2D image of the target feature to a second skeletal graph by segmenting the target feature from the 2D image and studying a flow of a contrast agent through the target feature;
performing graph matching of the first and second skeletal graph to obtain a rough alignment of the graphs; and
registering the first and second skeletal graph.

2. The method of claim 1 wherein the target feature is blood vessels in a particular tissue region.

3. The method of claim 1 wherein the step of converting the 3D image of the target feature to a first skeletal graph further comprises the steps of:
segmenting the target feature from the 3D image; and
extracting a centerline from the segmented 3D image.

4. The method of claim 3 wherein the centerline is extracted using a parallel thinning algorithm.

5. The method of claim 1 wherein the step of studying the flow of the contrast agent further comprises the steps of:
recording an arrival time and departure time of the flow of the contrast agent at each intersection of the target feature;
based on the arrival time and departure time determining if the intersection is a connected intersection or an overlapping intersection.

6. The method of claim 1 wherein the step of performing graph matching further comprises using rooted directed acyclic graphs.

7. The method of claim 1 wherein the step of registering the first and second skeletal graphs further comprises the step of:
using an iterative closest point algorithm to refine the registration.

8. The method of claim 1 wherein registration of the first and second skeletal graph is maintained by tracking the target feature in the 2D image.

9. The method of claim 1 wherein a monoplanar fluoro image is used to perform registration of the 2D and 3D images.

10. The method of claim 1 wherein the sequence of 2D images are sequential in time.

11. The method of claim 1 wherein the target feature is associated with a human organ.

12. The method of claim 11 wherein the organ is a liver.

13. A system for registering a sequence of inter-operative two dimensional (2D) images of a target feature with pre-operative three dimensional (3D) images of the target feature, the system comprising:
a 2D imaging system for imaging a target feature;
a database for storing 3D images of the target feature;
a processor for receiving and processing the 2D images, the processor performing the following steps:
i). converting the 3D image of the target feature to a first skeletal graph;
ii). converting the 2D image of the target feature to a second skeletal graph by segmenting the target feature from the 2D image and studying a flow of a contrast agent through the target feature;
iii). performing graph matching of the first and second skeletal graph to obtain a rough alignment of the graphs; and
iv). registering the first and second skeletal graph; and
a display for displaying the registered images.

14. The system of claim 13 wherein the target feature is blood vessels in a particular tissue region.

15. The system of claim 13 wherein the step of converting the 3D image of the target feature to a first skeletal graph further comprises the steps of:
segmenting the target feature from the 3D image; and
extracting a centerline from the segmented 3D image.

16. The system of claim 15 wherein the centerline is extracted using a parallel thinning algorithm.

17. The system of claim 13 wherein the step of studying the flow of the contrast agent further comprises the steps of:
recording an arrival time and departure time of the flow of the contrast agent at each intersection of the target feature;
based on the arrival time and departure time determining if the intersection is a connected intersection or an overlapping intersection.

18. The system of claim 13 wherein the step of performing graph matching further comprises using rooted directed acyclic graphs.

19. The system of claim 13 wherein the step of registering the first and second skeletal graphs further comprises the step of:
using an iterative closest point algorithm to refine the registration.

20. The system of claim 13 wherein registration of the first and second skeletal graph is maintained by tracking the target feature in the 2D image.

21. The system of claim 13 wherein a monoplanar fluoro image is used to perform registration of the 2D and 3D images.

22. The system of claim 13 wherein the sequence of 2D images are sequential in time.

23. The system of claim 13 wherein the target feature is associated with a human organ.

24. The system of claim 23 wherein the organ is a liver.

* * * * *